United States Patent
Wang et al.

(10) Patent No.: US 10,922,794 B2
(45) Date of Patent: Feb. 16, 2021

(54) IMAGE CORRECTION METHOD AND DEVICE

(71) Applicant: BOE TECHNOLOGY GROUP CO., LTD., Beijing (CN)

(72) Inventors: Tingting Wang, Beijing (CN); Xiaojun Tang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 166 days.

(21) Appl. No.: 16/229,895

(22) Filed: Dec. 21, 2018

(65) Prior Publication Data
US 2019/0370943 A1     Dec. 5, 2019

(30) Foreign Application Priority Data
May 31, 2018 (CN) .......................... 201810556536.X

(51) Int. Cl.
| | | |
|---|---|---|
| G06T 7/60 | (2017.01) | |
| G06T 5/00 | (2006.01) | |
| G06T 7/13 | (2017.01) | |
| G06T 3/00 | (2006.01) | |

(52) U.S. Cl.
CPC ................ G06T 5/006 (2013.01); G06T 3/00 (2013.01); G06T 7/13 (2017.01); G06T 7/60 (2013.01); G06T 2207/30244 (2013.01)

(58) Field of Classification Search
CPC combination set(s) only.
See application file for complete search history.

(56) References Cited

U.S. PATENT DOCUMENTS

| | | | |
|---|---|---|---|
| 6,577,330 B1* | 6/2003 | Tsuda | G06F 3/04815 |
| | | | 715/782 |
| 6,914,599 B1* | 7/2005 | Rowe | G06T 17/00 |
| | | | 345/420 |
| 9,563,814 B1* | 2/2017 | Wilbert | G06K 9/00 |
| 9,594,971 B1* | 3/2017 | Wilbert | G06K 9/6277 |
| 9,773,184 B1* | 9/2017 | Wilbert | G06K 9/325 |
| 9,779,318 B1* | 10/2017 | Wilbert | G06K 9/325 |
| 10,572,758 B1* | 2/2020 | Wilbert | G06T 3/40 |
| 2009/0122195 A1* | 5/2009 | van Baar | H04N 7/181 |
| | | | 348/584 |
| 2018/0129878 A1 | 5/2018 | Wang et al. | |
| 2019/0253597 A1* | 8/2019 | Satou | H04N 5/353 |

FOREIGN PATENT DOCUMENTS

| | | |
|---|---|---|
| CN | 102930515 A | 2/2013 |
| CN | 106203433 A | 12/2016 |
| CN | 107368829 A | 11/2017 |
| CN | 108038826 A | 5/2018 |

OTHER PUBLICATIONS

Chinese Office Action dated Dec. 18, 2019, from application No. 201810556536.X.

* cited by examiner

*Primary Examiner* — Iman K Kholdebarin
(74) *Attorney, Agent, or Firm* — Thomas|Horstemeyer, LLP

(57) ABSTRACT

The present disclosure relates to an image correction method and device. The method includes detecting an input image to obtain boundary straight lines. The method includes determining vertices based on the obtained boundary straight line. The method includes determining an estimated height-to-width ratio based on the obtained vertices. The method includes performing perspective transformation on the input image based on the estimated height-to-width ratio.

20 Claims, 6 Drawing Sheets

IMAGE CORRECTION METHOD AND DEVICE

CROSS REFERENCE

The present application is based upon and claims priority to Chinese Patent Application No. 201810556536.X, filed May 31, 2018, and the entire contents thereof are incorporated herein by reference.

TECHNICAL FIELD

The present disclosure relates to image processing technologies, and in particular, to an image correction method and device.

BACKGROUND

When photos or videos are taken, the captured images are often distorted due to factors such as shooting angle, positions, and the like, which is inconvenient for viewers to view images, or subsequent processes such as image feature extraction and recognition may be influenced. The currently widely used correction method is to first perform edge detection using various edge detection operators (such as Roberts, Sobel, Prewitt, Log, Canny, etc.), and then perform line feature extraction on the edge image. However, in the existing image correction method, the corrected image distortion is relatively large, and the image quality is poor.

It should be noted that the information disclosed in the Background section above is only for enhancing the understanding of the background of the present disclosure, and thus may include information that does not constitute prior art known to those of ordinary skill in the art.

SUMMARY

Arrangements of the present disclosure provide an image correction method and device.

According to an aspect of the present disclosure, an image correction method includes detecting an input image to obtain boundary straight lines. The method includes determining vertices based on the obtained boundary straight lines. The method includes determining an estimated height-to-width ratio based on the determined vertices. The method includes performing a perspective transformation on the input image based on the estimated height-to-width ratio.

According to another aspect of the present disclosure, an image correction device is provided. The device includes a processor. The device includes a memory storing program instructions which are executable by the processor. The processor is configured to perform the foregoing image correction method.

According to another aspect of the present disclosure, a readable storage medium is also provided, and when instructions in the storage medium are executed by a processor of an electronic device, the electronic device can perform the foregoing method.

BRIEF DESCRIPTION OF THE DRAWINGS

The above and other features and advantages of the present disclosure will become more apparent from the detailed description by describing exemplary arrangements thereof in detail by referring to the drawings. It is apparent that the drawings in the following description show only some of the arrangements of the present disclosure, and other drawings may be obtained by those skilled in the art without departing from the drawings described herein. In the drawings.

DETAILED DESCRIPTION

Figure 1:
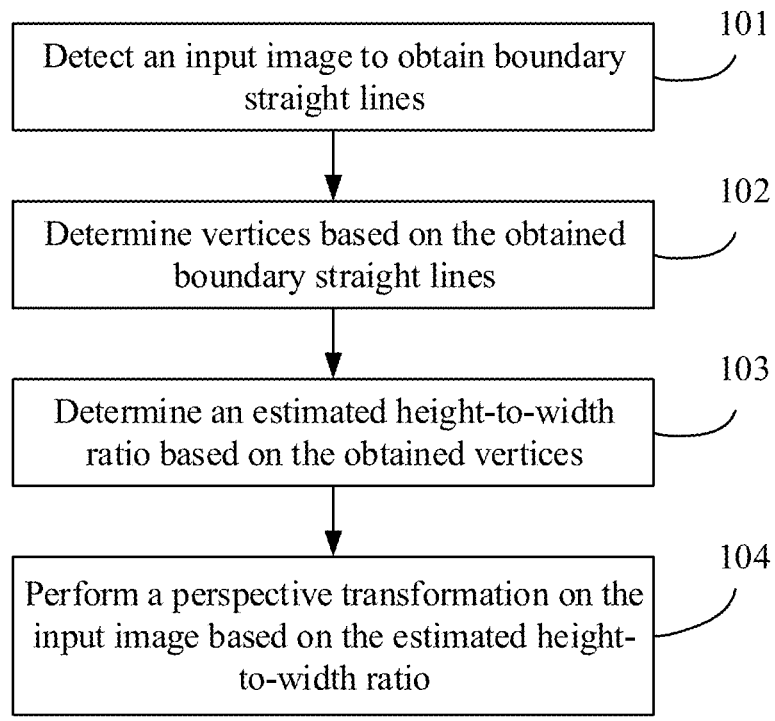
FIG. 1 shows a flow chart of an image correction method according to an exemplary arrangement of the present disclosure.

Example arrangements will now be described more fully with reference to the accompanying drawings. However, the arrangements can be implemented in a variety of forms and should not be construed as being limited to the examples set forth herein; rather, these arrangements are provided so that this disclosure will be more complete so as to convey the idea of the exemplary arrangements to those skilled in this art. The described features, structures, or characteristics in one or more arrangements may be combined in any suitable manner.

In addition, the drawings are merely schematic representations of the present disclosure and are not necessarily drawn to scale. The same reference numerals in the drawings denote the same or similar parts, and the repeated description thereof will be omitted.

FIG. 1 shows a flow chart of an image correction method according to an exemplary arrangement of the present disclosure. The method includes the following blocks.

In block 101, an input image is detected to obtain boundary straight lines.

In block 102, vertices are determined based on the obtained boundary straight lines.

In block 103, an estimated height-to-width ratio is determined based on the obtained vertices.

In block 104, a perspective transformation is performed on the input image based on the estimated height-to-width ratio.

In the technical solution provided by the arrangement of the present disclosure, the input image is detected to obtain boundary straight lines. The vertices are determined based on the obtained boundary straight lines. The estimated height-to-width ratio is determined based on the obtained vertices. The perspective transformation is performed on the input image based on the estimated height-to-width ratio. Since the height-to-width ratio is considered, the corrected image can be close to the real image, thus reducing the degree of distortion of the corrected image and improving the image quality.

Implementations of the present disclosure will be described below by using examples.

Figure 2:
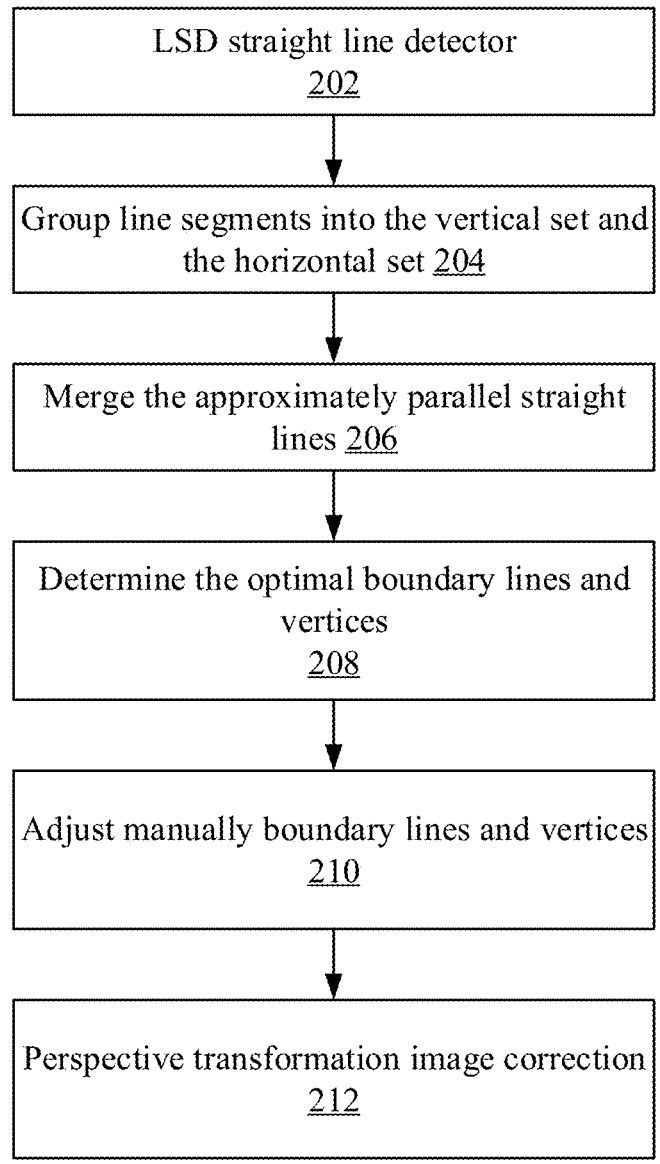
FIG. 2 shows a flow chart of an image correction process according to an exemplary arrangement of the present disclosure.

FIG. 2 shows a flow chart of an exemplary image correction process of the present disclosure. The process includes block 202 to use an LSD straight line detector. The process includes block 204 to group line segments into a vertical set and a horizontal set. The process includes block 206 to merge the approximately parallel straight line. The process includes block 208 to determine optimal boundary lines and vertices. The process includes block 210 to adjust manually boundary lines and vertices. The process includes block 212 to perform a perspective transformation image correction.

In the technical solutions of the arrangements of the present disclosure, in order to improve the detection accuracy, an LSD (line segment detector) method may be used to perform straight line detection on the input image. In the following descriptions, for example, the straight linear detection (LSD) is used. In other arrangements, those skilled in the art will appreciate that other straight line detection methods can be used according to actual needs.

The LSD straight line segment detection operator is a straight line detection method proposed in 2010. As compared with the Hough transform, the speed of LSD is fast, and there is no need to manually set any parameters and providing of an edge image is not needed. By using LSD, the detection accuracy and calculation efficiency reach a good balance. The LSD method outputs two endpoint coordinates of a straight line. In the arrangement of the present disclosure, the −log(NFA) output value is used as the score of the straight line. NFA is the number of false alarms, and is the intermediate calculation result of the LSD method. Here, for example, we define that the properties of a straight line includes two endpoint coordinates and its score.

The block of obtaining boundary straight lines in 101 may further include the followings: detecting the input image to obtain a horizontal straight line set and a vertical straight line set; merging approximately parallel straight line segments in the horizontal straight line set and the vertical straight line set respectively; and selecting two straight line segments from the horizontal straight line set and the vertical straight line set respectively as the boundary straight lines. Detecting the input image to obtain a horizontal straight line set and a vertical straight line set may further include the followings: detecting the input image to obtain boundary straight line segments; determining angles between individual straight line segments and a horizontal axis; and grouping straight line segments, angles of which with respect to the horizontal axis are in a first range, into the horizontal straight line set, and grouping straight line segments, angles of which with respect to the horizontal axis are in a second range, into the vertical straight line set. It should be noted that the horizontal axis can be selected as needed, for example, the horizontal axis can be a line parallel to the long side of the image, or it can be a line not parallel to the long side of the image.

There are many interference straight lines in the straight lines detected by the LSD that are not needed. A series of processes on the straight lines are performed to obtain the desired boundary straight lines. The angle between each straight line and the horizontal axis can be calculated. Straight lines, the angles of which with respect to the horizontal axis are within a first range (such as 0 to 45 degrees), can be grouped into a horizontal straight line set HorzontalGroup, and straight lines, the angles of which with respect to the horizontal axis are within a second range (such as 45 to 90 degrees) can be grouped into a vertical straight line set VerticalGroup.

Merging approximately parallel straight line segments in the horizontal straight line set and the vertical straight line set respectively may further include the followings. For the horizontal straight line set, such an operation includes determining angles and distances between every two straight line segments in the horizontal straight line set, and merging two straight line segments, an angle between which is smaller than an angle threshold and a distance between which is smaller than a distance threshold, into one straight line segment. For the vertical straight line set, the operation includes determining angles and distances between every two straight line segments in the vertical straight line set, and merging two straight line segments, an angle between which is smaller than an angle threshold and a distance between which is smaller than a distance threshold, into one straight line segment.

Optionally, operations can be performed for the vertical straight line set (or the horizontal straight line set) to merge approximately parallel straight line segments. Since the LSD is a straight line segment detector, a long straight line may be detected as multiple straight line segments, and the multiple straight line segments may be merged. The angles (from 0 to 90 degrees) between every two straight line segments are calculated. Two straight line segments, an angle between which is smaller than an angle threshold and a distance between which is smaller than a distance threshold, can be regarded as one straight line segment. The straight line segment with longer length in the two line segments may serve to represent the two straight line segments (i.e., the two line segments can be merged into one), and a score of the merged straight line segment is the sum of the scores of the two straight line segments.

Selecting two straight line segments from the horizontal straight line set and the vertical straight line set respectively as the boundary straight lines may futher include the followings determining scores of merged straight line segments in the horizontal straight line set and the vertical straight line set; selecting from the horizontal straight line set a horizontal straight line segment having a highest score, and selecting from the horizontal straight line set another horizontal straight line segment whose distance from the horizontal straight line segment having the highest score is within a range; and selecting from the vertical straight line set a vertical straight line segment having a highest score, and selecting from the vertical straight line set another vertical straight line segment whose distance from the vertical straight line segment having the highest score is within a range, optionally, the range can be preset.

The selected two horizontal straight line segments and the selected two vertical straight line segments are determined as the boundary straight lines.

Specifically, for the vertical set (or the horizontal set), first, a straight line segment having the highest score in VerticalGroup (or HorzontalGroup) is selected. With the position of the straight line segment as a reference, another straight line segment which has a high score and is away from the reference straight line segment (the distance between the straight line segment having the highest score and the selected another line segment is within a range), is selected. In VerticalGroup (or HorzontalGroup), two straight line segments with high scores may be obtained, which are called as lineLeft and lineRight (or lineTop, and lineBottom). A total of four boundary straight lines are obtained from the two sets of straight lines. Here, the range may refer to a ratio of a distance between another selected straight line segment having a high score and the straight line segment having the highest score to a width or a height of the estimated image. For example, the ratio is 0.5. As described above, the straight line segments in the horizontal straight line set and the vertical straight line set are all approximately parallel, that is, the line segments are not completely parallel, and there may be a relatively small angle between the straight line segments. In this case, for example, when determining the distance between another straight line segment having a high score and the straight line having the highest score in the horizontal straight line set, the distance between the center points of the two straight line segments may be determined, or the distance between the uppermost endpoints of the two straight segments may be determined. Similarly, when determining the distance between another straight line segment having a high score and the straight line having the highest score in the vertical straight line set, the distance between the center points of the two straight line segments can be determined, or the distance between the leftmost endpoints of the two straight line segments may be determined.

According to an exemplary arrangement, the operation of detecting the input image to obtain boundary straight lines includes detecting the input image based on the first rule to obtain the boundary straight lines.

According to an exemplary arrangement, determining scores of merged straight line segments in the horizontal straight line set and the vertical straight line set includes determining the scores of the merged straight line segments in the horizontal straight line set and the vertical straight line set based on a second rule. A parameter in the second rule (i.e., the rule for determining the scores) is related to the first rule.

For example, if the input image is detected by using the LSD method (an example of the first rule), the score of each straight line segment can be determined as −log(NFA), and the score of the merged straight line segment is the sum of −log(NFA) of individual straight line segments, and the NFA is the intermediate calculation result of the LSD.

If the input image is detected by using the Hough method (another example of the first rule), the score of each straight line segment can be determined as the sum of the gradients of all the points on each straight line segment, and the score of the merged straight line segment is the sum of the scores of individual straight line segments.

That is, the determination of the score of each straight line segment is related to the detection method of the straight line segment. In the arrangements of the present disclosure, the specific score determination method is not specifically limited, and a person skilled in the art may select a corresponding score determination method according to specific requirements.

According to another arrangement, selecting two straight line segments from the horizontal straight line set and the vertical straight line set respectively as the boundary straight lines may further include the followings: dividing the horizontal straight line set into an upper subset and a lower subset around a center of the input image; dividing the horizontal straight line set into a left subset and a right subset around the center of the input image; selecting any one straight line segment from the upper subset, the lower subset, the left subset, and the right subset, respectively, so that the selected straight line segments form a plurality of four-straight line combinations; determining a score for each of the combinations according to a scoring rule; and selecting straight line segments in one of the combinations having the highest score as the boundary straight lines.

Considering that in an actual image, objects are generally located at the center of the field of view, the vertical set and the horizontal set can be further divided. For example, the vertical set can be divided into an upper subset topLineSet and a lower subset bottomLineSet, with the center of the image as a center. The horizontal set may be divided into a left subset leftLineSet and a right subset rightLineSet, with the center of the image as a center. For each of topLineSet, bottomLineSet, leftLineSet, and rightLineSet, any one straight line is selected. Optionally, the scoring rule comprises determining whether at least one of parallelism, an area, and a matching degree of a pattern formed by four straight line segments in each of the combinations meets a condition. The parallelism, the area, and the matching degree of the pattern formed by the four straight line segments are calculated, and the combinations of the four selected line segments are scored based on these conditions. The combination having the highest score is the optimal combination, and the four boundary straight line segments in the optimal combination are the optimal boundary straight line segments, which are called as lineLeft, lineRight, lineTop, and lineBottom.

According to an exemplary arrangement, determining the vertices based on the obtained boundary straight lines may include determining intersection points of the obtained boundary straight lines; and selecting the vertices from the intersection points.

According to an exemplary arrangement, selecting the vertices from the intersection points comprises: selecting four intersection points from the intersection points as the vertices without considering common points.

Optionally, after obtaining four boundaries, there can be one more operation to search for the optimal boundary near the boundary straight lines, for example, by interpolating. The searched boundaries are parallel to the previously obtained boundaries and have a certain distance from the previously obtained boundaries. The straight lines obtained at this time are the optimal boundaries: lineLeft, lineRight, lineTop and lineBottom. Among the four boundary straight lines obtained, if every two lines intersect, the number of intersection points may be 4, 5, and 6, the condition of common point is not considered. For example, if three or more lines intersect, they may intersect at a single point, i.e., the common point or a concurrent point. When vertices are determined in arrangements of the present disclosure, the case of the common point or the concurrent point is not considered.

Figure 3:
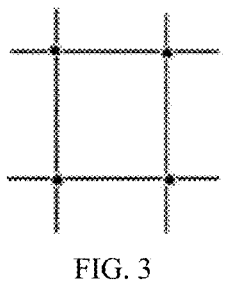
FIGS. 3 to 5 show manners in which vertices are selected according to an arrangement of the present disclosure.

When the number of intersection points is 4, two pairs of parallel straight lines intersect, and four intersection points can be directly obtained. The point selection manner can be shown in FIG. 3.

Figure 4:
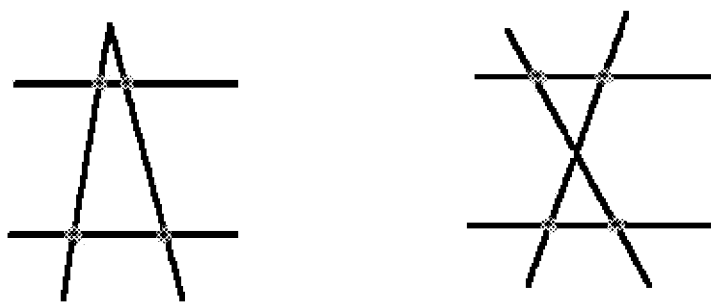

When the number of intersection points is 5, a pair of straight lines are parallel straight lines, and the point selection manner can be shown in FIG. 4.

Figure 5:
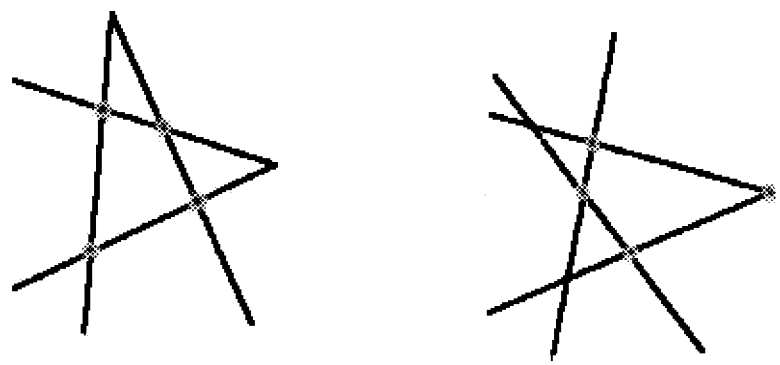

When the number of intersection points is 6, there are no parallel straight lines, and any two straight lines intersect to obtain a total of 6 intersection points. Among the 6 intersection points, 4 intersection points are selected according to the rules, and the selection manner can be shown in FIG. 5.

After the vertices (i.e., the selected intersection points) are obtained, the estimated height-to-width ratio can also be determined based on the obtained vertices. The determination of the height-to-width ratio may further include the followings: determining lengths H1 and H2 of two vertical straight lines and lengths W1 and W2 of the two horizontal straight lines based on the quadrilateral formed by the obtained vertices; and determining the estimated height-to-width ratio of the input image based on the lengths H1 and H2 of two vertical straight lines and lengths W1 and W2 of the two horizontal straight lines, a distance from a shooting device of the input image to the input image, a viewing angle of the shooting device and a height of the input image.

According to an exemplary arrangement, performing a perspective transformation on the image to be corrected based on the estimated height-to-width ratio may further include the followings: determining target vertices based on the obtained vertices and the estimated height-to-width ratio; forming a perspective transformation matrix based on the obtained vertices and the target vertices; and performing the perspective transformation on the input image by the perspective transformation matrix.

Figure 6:
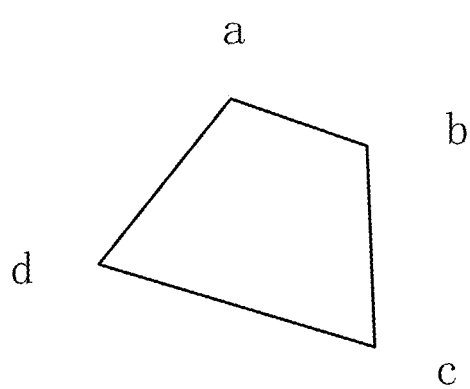
FIG. 6 shows a schematic diagram of judging an order of vertices.

Optionally, after obtaining four valid vertices, the following steps can be used to determine the vertex order. FIG. 6 shows a schematic diagram of judging the order of vertices.

For example, four valid vertices are assumed to be (a, b, c, d), vertices a and b form straight line1, and vertices c and d form straight line1', vertices a and d form straight line2, vertices b and c form straight line2'. Two pair of straight lines are linepar1 (line1, line1') and linepair2(line2, line2').

The angle between line1 and the horizontal axis is θ1, the angle between line1' and the horizontal axis is θ1', the angle between line2 and the horizontal axis is θ2, and the angle between line2' and the horizontal axis is θ2', and a calculation is done as follows:

$$t1 = |\theta 1| + |\theta 1'| + |\theta 2 - \frac{\pi}{2}| + |\theta 2' - \frac{\pi}{2}|$$

$$t2 = |\theta 1 - \frac{\pi}{2}| + |\theta 1' - \frac{\pi}{2}| + |\theta 2| + |\theta 2'|$$

If t1>t2, it can be determined that linepair1 is a horizontal pair, the lines in the horizontal pair are the upper and lower boundaries, linepair2 is a vertical pair, and the lines in the vertical pair are the left and right boundaries.

If t1<t2, it can be determined linepair1 is a vertical pair, the lines in the vertical pair are the left and right boundaries, linepair2 is a horizontal pair, and the lines in the horizontal pair are the left and right boundaries.

Figure 7:
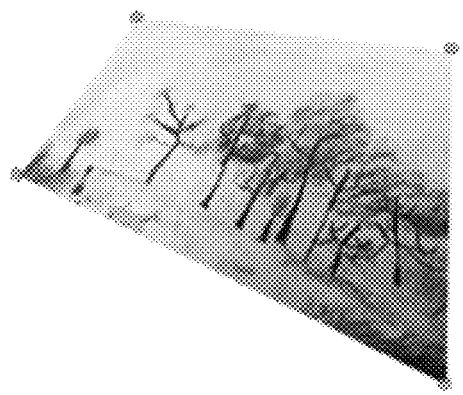
FIG. 7 shows a vertex obtaining result of an actual shot image.

The intersection points of the straight lines in linepair1 and linepair2 are determined, and then the order of the four vertices can be calculated, and the four vertices are labeled as pLeftTop, pLeftBottom, pRightTop, and pRightBottom. FIG. 7 shows the vertex obtaining result of an actual shot image.

If an image is input, four recommended vertices may be directly given. If the recommended vertices are not desired, manual adjustments may be performed. The conventional perspective transformation does not consider the height-to-width ratio of the corrected image and the height-to-width ratio of the actual image, which results in a large distortion of the corrected image. The present disclosure proposes a method for approximately estimating the height-to-width ratio as follows.

Figure 8:
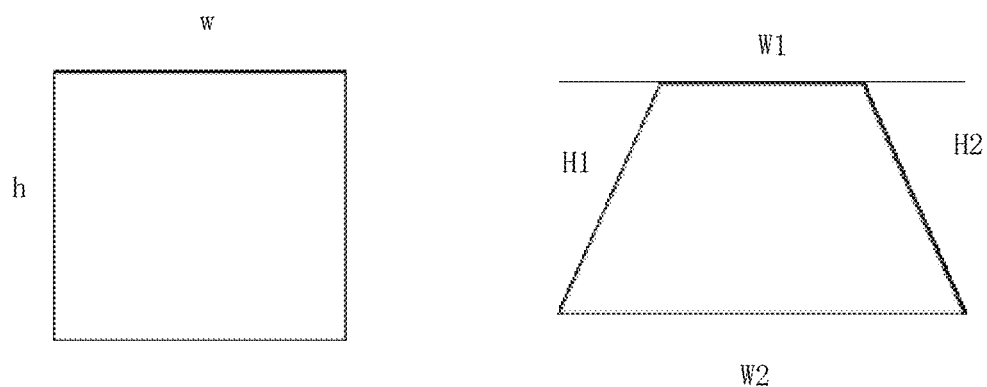
FIG. 8 schematically illustrates a height-to-width ratio estimation method.

The height-to-width ratio estimation method will be described using FIG. 8 as an example. It is assumed that a rectangle is distorted to a normal quadrilateral, as shown in FIG. 8.

First, H=√H1\*H2, W=√W1\*W2 are estimated.
Calculation is performed based on:

$$\frac{Hr}{D} \approx 2*\tan\left(\frac{\alpha}{2}\right)*\frac{H}{H_{max}},$$

Hr is the actual physical size of the boundary, D is the distance from the camera to the painting (an example of the image in the present disclosure), $H_{max}$ is the height of the painting, and α is the viewing angle of the camera angle which is about 60 degrees. Then, $$\frac{Hr}{D}$$

can be solved by this formula.
Calculation is performed as follows:

$$\frac{D - \frac{1}{2}*H_r*\sin\theta}{D + \frac{1}{2}*H_r*\sin\theta} = \frac{W_1}{W2},$$

where θ is the angle between the painting and the vertical line. By this formula, θ can be determined.
The estimated value is adjusted as follows:

$$H' = \frac{H}{\cos\theta},$$

where H' is the estimated height of the painting. Similarly, the width can be adjusted as follows:

$$W' = \frac{W}{\cos\beta}.$$

Here, β is similar to θ, and β is the angle between the painting and the horizontal line (or the horizontal direction).
The height-to-width ratio is estimated as follows:

$$\text{ratio} = \frac{H'}{W'}.$$

Based on the four vertices pLeftTop, pLeftBottom, pRightTop, and pRightBottom obtained in the previous steps, the distance between pLeftBottom and pRightBottom is calculated as the width, the width of the corrected image is height=ratio*width, and the new four target positions corresponding to the four vertices are pLeftTop_new(0,0), pLeftBottom_new(0, height), pRightTop_new(width, 0), pRightBottom_new(width, height).

Figure 9A:
FIG. 9*a* shows an image without adding the estimated height-to-width ratio correction.
Figure 9B:
FIG. 9*b* shows an image with the estimated height-to-width ratio correction added.

The perspective transformation matrix can be obtained from the actual four vertices and the four corresponding target points, and the perspective transformation is performed on the distorted image to obtain the corrected image. FIG. 9a shows an image without adding the estimated height-to-width ratio correction. FIG. 9b shows an image with the estimated height-to-width ratio correction added.

The usual distortion correction method first uses various edge detection operators (Roberts, Sobel, Prewitt, Log, Canny) for edge detection, then uses Hough transform or Radon transform to extract line features from edge images, and finally finds intersection points to perform perspective transformation correction. Many straight lines are detected by mistake when the Hough detection is used in the case of complex background. In contrast, the straight lines detected by using the arrangements of the present disclosure are relatively clean, the detection speed is fast, and the height-to-width ratio is estimated to ensure the image quality.

Figure 10:
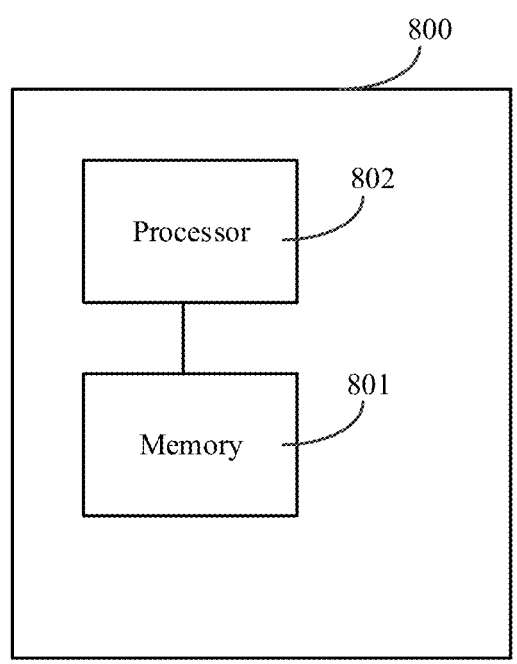
FIG. 10 shows a block diagram of an image correcting device according to an exemplary arrangement of the present disclosure.

FIG. 10 shows a block diagram of an image correcting device of an arrangement of the present disclosure. The work recommendation device 800 can include a memory 801 and a processor 802. Computer program instructions which can be executed in the processor 802 are stored in the memory 801. The processor 802 executes computer programs to implement the methods described herein.

The memory 801 can be implemented by any type or a combination of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The device 800 can be various devices with computing and processing capabilities, and can include various input devices (e.g., user interface, keyboard, etc.), various output devices (e.g., loudspeakers, etc.) and display devices in addition to the memory 801 and the processor 802, and details are not provided herein.

An arrangement of the present disclosure further provides a computer readable storage medium storing computer programs, and when the computer programs are executed by the processor, the steps of the method provided by the arrangements of the present disclosure is implemented.

It should be noted that although modules or units of devices for executing functions are described above, such division of modules or units is not mandatory. In fact, features and functions of two or more of the modules or units described above may be embodied in one module or unit in accordance with the arrangements of the present disclosure. Alternatively, the features and functions of one module or unit described above may be further divided into multiple modules or units.

In addition, although the various steps of the method of the present disclosure are described in a particular order in the figures, it is not required or implied that the steps must be performed in the specific order, or all the steps shown must be performed to achieve the desired result. Additionally or alternatively, certain steps may be omitted, multiple steps may be merged into one step, and/or one step may be decomposed into multiple steps and so on.

Other arrangements of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and arrangements are illustrative, and the real scope and spirit of the present disclosure is defined by the appended claims.

What is claimed is:

1. An image correction method, comprising:
    detecting an input image to obtain boundary straight lines, wherein detecting the input image to obtain boundary straight lines comprises:
        detecting the input image to obtain a horizontal straight line set and a vertical straight line set;
        merging approximately parallel straight line segments in the horizontal straight line set and the vertical straight line set respectively; and
    selecting two straight line segments from the horizontal straight line set and the vertical straight line set respectively as the boundary straight lines, wherein selecting two straight line segments from the horizontal straight line set and the vertical straight line set respectively as the boundary straight lines, comprises:
        determining scores of merged straight line segments in the horizontal straight line set and the vertical straight line set;
        selecting from the horizontal straight line set a horizontal straight line segment having a highest score, and selecting from the horizontal straight line set another horizontal straight line segment whose distance from the horizontal straight line segment having the highest score is within a range; and
        selecting from the vertical straight line set a vertical straight line segment having a highest score, and selecting from the vertical straight line set another vertical straight line segment whose distance from the vertical straight line segment having the highest score is within a range, wherein the selected two horizontal straight line segments and the selected two vertical straight line segments are determined as the boundary straight lines;
    determining vertices based on the obtained boundary straight lines;
    determining an estimated height-to-width ratio based on the determined vertices; and
    performing a perspective transformation on the input image based on the estimated height-to-width ratio.

2. The method according to claim 1, wherein detecting the input image to obtain the horizontal straight line set and the vertical straight line set comprises:
    detecting the input image to obtain boundary straight line segments;
    determining angles between individual straight line segments and a horizontal axis; and
    grouping straight line segments, angles of which with respect to the horizontal axis are in a first range, into the horizontal straight line set, and grouping straight line segments, angles of which with respect to the horizontal axis are in a second range, into the vertical straight line set.

3. The method according to claim 1, wherein merging approximately parallel straight line segments in the horizontal straight line set and the vertical straight line set respectively, comprises:
    for the horizontal straight line set:
        determining angles and distances between every two straight line segments in the horizontal straight line set; and
        merging two straight line segments, an angle between which is smaller than an angle threshold and a distance between which is smaller than a distance threshold, into one straight line segment;
    for the vertical straight line set:
        determining angles and distances between every two straight line segments in the vertical straight line set; and
        merging two straight line segments, an angle between which is smaller than an angle threshold and a distance between which is smaller than a distance threshold, into one straight line segment.

4. The method according to claim 1, wherein:
   detecting the input image to obtain boundary straight lines, comprises: detecting the input image based on a first rule to obtain the boundary straight lines; and
   determining scores of merged straight line segments in the horizontal straight line set and the vertical straight line set, comprises: determining the scores of the merged straight line segments in the horizontal straight line set and the vertical straight line set based on a second rule, wherein a parameter in the second rule is related to the first rule.

5. The method according to claim 1, wherein selecting two straight line segments from the horizontal straight line set and the vertical straight line set respectively as the boundary straight lines, comprises:
   dividing the horizontal straight line set into an upper subset and a lower subset around a center of the input image;
   dividing the horizontal straight line set into a left subset and a right subset around the center of the input image;
   selecting one straight line segment from each of the upper subset, the lower subset, the left subset, and the right subset so that the selected straight line segments form a plurality of four-straight line combinations;
   determining a score for each of the plurality of four-straight line combinations according to a scoring rule; and
   selecting straight line segments in one of the plurality of four-straight line combinations having a highest score as the boundary straight lines.

6. The method according to claim 5, wherein the scoring rule comprises determining whether at least one of parallelism, an area, and a matching degree of a pattern formed by four straight line segments in each of the plurality of four-straight line combinations meets a condition.

7. The method according to claim 1, wherein determining the vertices based on the obtained boundary straight lines comprises:
   determining intersection points of the obtained boundary straight lines; and
   selecting the vertices from the intersection points.

8. The method according to claim 7, wherein selecting the vertices from the intersection points comprises: selecting four intersection points from the intersection points as the vertices without considering common points.

9. The method according to claim 1, wherein determining the estimated height-to-width ratio based on the obtained vertices comprises:
   determining lengths of two vertical straight lines and two horizontal straight lines of a quadrilateral formed by the obtained vertices; and
   determining the estimated height-to-width ratio of the input image based on the lengths of two vertical straight lines and the two horizontal straight lines, a distance from a shooting device of the input image to the input image, a viewing angle of the shooting device, and a height of the input image.

10. The method according to claim 1, wherein performing a perspective transformation on the image based on the estimated height-to-width ratio comprises:
    determining target vertices based on the obtained vertices and the estimated height-to-width ratio;
    forming a perspective transformation matrix based on the obtained vertices and the target vertices; and
    performing the perspective transformation on the input image by the perspective transformation matrix.

11. The method according to claim 1, wherein detecting the input image to obtain boundary straight lines comprises: detecting the input image using a line segment detector method to obtain boundary straight lines.

12. An image correction device, comprising:
    at least one hardware processor; and
    a memory storing program instructions executable by the at least one hardware processor that, when executed, direct the at least one hardware processor to:
    detect an input image to obtain boundary straight lines by:
        detecting the input image to obtain a horizontal straight line set and a vertical straight line set;
        merging approximately parallel straight line segments in the horizontal straight line set and the vertical straight line set, respectively; and
        determining scores of merged straight line segments in the horizontal straight line set and the vertical straight line set;
        selecting from the horizontal straight line set a horizontal straight line segment having a highest score;
        selecting from the horizontal straight line set another horizontal straight line segment whose distance from the horizontal straight line segment having the highest score is within a range; and
        selecting from the vertical straight line set a vertical straight line segment having a highest score; and
        selecting from the vertical straight line set another vertical straight line segment whose distance from the vertical straight line segment having the highest score is within a range, wherein the selected two horizontal straight line segments and the selected two vertical straight line segments are determined as the boundary straight lines;
    determine vertices based on the obtained boundary straight lines;
    determine an estimated height-to-width ratio based on the determined vertices; and
    perform a perspective transformation on the input image based on the estimated height-to-width ratio.

13. The image correction device according to claim 12, wherein the at least one hardware processor is further directed to:
    detect the input image to obtain boundary straight line segments;
    determine angles between individual straight line segments and a horizontal axis; and
    group straight line segments, angles of which with respect to the horizontal axis are in a first range, into the horizontal straight line set, and group straight line segments, angles of which with respect to the horizontal axis are in a second range, into the vertical straight line set.

14. The image correction device according to claim 12, wherein the at least one hardware processor is further directed to:
    for the horizontal straight line set:
        determine angles and distances between every two straight line segments in the
        horizontal straight line set; and
        merge two straight line segments, an angle between which is smaller than an angle threshold and a distance between which is smaller than a distance threshold, into one straight line segment;

for the vertical straight line set:
  determine angles and distances between every two straight line segments in the vertical straight line set; and
  merge two straight line segments, an angle between which is smaller than an angle threshold and a distance between which is smaller than a distance threshold, into one straight line segment.

15. The image correction device according to claim 12, wherein the at least one hardware processor is further directed to:
    detect the input image based on a first rule to obtain the boundary straight lines; and
    determine the scores of the merged straight line segments in the horizontal straight line set and the vertical straight line set based on a second rule, wherein a parameter in the second rule is related to the first rule.

16. A non-transitory computer-readable storage medium comprising program instructions executable by at least one hardware processor that, when executed, directed the at least one hardware processor of an electronic device to:
    detect an input image to obtain boundary straight lines by:
      detecting the input image to obtain a horizontal straight line set and a vertical straight line set;
      merging approximately parallel straight line segments in the horizontal straight line set and the vertical straight line set, respectively; and
      determining scores of merged straight line segments in the horizontal straight line set and the vertical straight line set;
      selecting from the horizontal straight line set a horizontal straight line segment having a highest score;
      selecting from the horizontal straight line set another horizontal straight line segment whose distance from the horizontal straight line segment having the highest score is within a range; and
      selecting from the vertical straight line set a vertical straight line segment having a highest score; and
      selecting from the vertical straight line set another vertical straight line segment whose distance from the vertical straight line segment having the highest score is within a range, wherein the selected two horizontal straight line segments and the selected two vertical straight line segments are determined as the boundary straight lines;
    determine vertices based on the obtained boundary straight lines;
    determine an estimated height-to-width ratio based on the determined vertices; and
    perform a perspective transformation on the input image based on the estimated height-to-width ratio.

17. The non-transitory computer-readable storage medium according to claim 16, wherein the input image is detected to obtain the horizontal straight line set and the vertical straight line set by:
    detecting the input image to obtain boundary straight line segments;
    determining angles between individual straight line segments and a horizontal axis; and
    grouping straight line segments, angles of which with respect to the horizontal axis are in a first range, into the horizontal straight line set, and grouping straight line segments, angles of which with respect to the horizontal axis are in a second range, into the vertical straight line set.

18. The non-transitory computer-readable storage medium according to claim 16, wherein the approximately parallel straight line segments in the horizontal straight line set and the vertical straight line set are respectively merged by:
    for the horizontal straight line set:
      determining angles and distances between every two straight line segments in the horizontal straight line set; and
      merging two straight line segments, an angle between which is smaller than an angle threshold and a distance between which is smaller than a distance threshold, into one straight line segment;
    for the vertical straight line set:
      determining angles and distances between every two straight line segments in the vertical straight line set; and
      merging two straight line segments, an angle between which is smaller than an angle threshold and a distance between which is smaller than a distance threshold, into one straight line segment.

19. The non-transitory computer-readable storage medium according to claim 16, wherein:
    the input image is detected to obtain boundary straight lines by detecting the input image based on a first rule to obtain the boundary straight lines; and
    scores of merged straight line segments in the horizontal straight line set and the vertical straight line set are determined by determining the scores of the merged straight line segments in the horizontal straight line set and the vertical straight line set based on a second rule, wherein a parameter in the second rule is related to the first rule.

20. The non-transitory computer-readable storage medium according to claim 16, wherein the two straight line segments from the horizontal straight line set and the vertical straight line set respectively are selected as the boundary straight lines by:
    dividing the horizontal straight line set into an upper subset and a lower subset around a center of the input image;
    dividing the horizontal straight line set into a left subset and a right subset around the center of the input image;
    selecting one straight line segment from each of the upper subset, the lower subset, the left subset, and the right subset so that the selected straight line segments form a plurality of four-straight line combinations;
    determining a score for each of the plurality of four-straight line combinations according to a scoring rule; and
    selecting straight line segments in one of the plurality of four-straight line combinations having a highest score as the boundary straight lines.

* * * * *